(12) United States Patent
Nagahara

(10) Patent No.: US 7,522,348 B2
(45) Date of Patent: Apr. 21, 2009

(54) ZOOM LENS AND PROJECTION DISPLAY DEVICE USING THE SAME

(75) Inventor: Akiko Nagahara, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 0 days.

(21) Appl. No.: 11/730,135

(22) Filed: Mar. 29, 2007

(65) Prior Publication Data
US 2007/0229967 A1 Oct. 4, 2007

(30) Foreign Application Priority Data
Mar. 30, 2006 (JP) .............................. P2006-093770

(51) Int. Cl.
*G02B 15/14* (2006.01)
(52) U.S. Cl. ...................... 359/683; 359/676
(58) Field of Classification Search ................ 359/676, 359/683
See application file for complete search history.

(56) References Cited
U.S. PATENT DOCUMENTS
6,285,509 B1 9/2001 Nakayama et al.
6,542,311 B2 4/2003 Nagahara et al.
6,738,196 B2 * 5/2004 Yamamoto .................. 359/680

FOREIGN PATENT DOCUMENTS
JP 2000-111797 A 4/2000
JP 2002-148516 A 5/2002

* cited by examiner

*Primary Examiner*—William C Choi
(74) *Attorney, Agent, or Firm*—Birch, Stewart, Kolasch & Birch, LLP

(57) ABSTRACT

A zoom lens includes in order from a magnification side a first to fifth lens groups $G_1$ to $G_5$. The first and fifth lens group is fixed during varying of a power. The first lens group executes focusing. The second, third and fourth lens groups move interrelatedly during the varying of the power. The first lens group includes in order from the magnification side a glass lens having a convex surface of a negative meniscus shape directed toward the magnification side, and a plastic lens having a convex surface of a negative meniscus plane directed toward the magnification side. At least one surface of the plastic lens is an aspheric surface. The glass lens satisfies:

1.56<Nd<1.80 vd>45 where Nd denotes refractive index with respect to d-line, and vd denotes Abbe number with respect to d-line.

28 Claims, 10 Drawing Sheets

EXAMPLE 1

EXAMPLE 4

EXAMPLE 5

ZOOM LENS AND PROJECTION DISPLAY DEVICE USING THE SAME

BACKGROUND OF THE INVENTION

1. Technical Field

The invention relates to an image forming zoom lens for use in an imaging device, such as CCD and a camera tube, or in a camera using a silver halide film; and relates to a projection zoom lens for use in a projection television and. More particularly, the invention relates to a projection zoom lens for use in a projection display device using a liquid crystal display device or DMD (digital micromirror device), and a projection display device using the same.

2. Description of the Related Art

JP 2002-148516 A (corresponding to U.S. Pat. No. 6,542, 311) discloses a zoom lens having the five-group configuration. This zoom lens has a power arrangement of negative, positive, positive, negative and positive sequentially from the magnification side. Although JP 2002-148516 A uses only glass spherical lenses but uses no aspherical lens, JP 2002-148156 A achieves miniaturization. Also, this zoom lens is configured so that a telecentric property and a proper back focus can be obtained on the reduction side. JP 2000-111797 A (one of basic Japanese patent applications of U.S. Pat. No. 6,285,509) discloses another zoom lens having the five-group configuration and having the similar power arrangements. The zoom lens disclosed in JP 2000-111797 A can maintain the telecentric property over a full variable power range.

However, the zoom lens disclosed in JP 2002-148516 A still leaves room for improvement as to a distortion correction and has not a sufficient brightness. Also, in JP 2000-111797 A, an aspherical lens is provided in front of the first lens of the first lens group, and a plastic lens is used as the first lens for the purpose of a molding easiness and a cost reduction. In this case, from the viewpoint of the weather resistance, it is not preferable to make the first lens, which is to be susceptible to damage, of plastic.

SUMMARY OF THE INVENTION

The invention has been made in view of the above circumstances and provides a zoom lens and a projection display device, which are light in weight, small in size and wide in view angle, can correct satisfactorily various aberrations, and are excellent in a weather resistance.

According to an aspect of the invention, a zoom lens includes first to fifth lens groups in order from a magnification side. The first lens group has a negative refractive power. The first lens group is fixed during varying of a power of the zoom lens and executes focusing. The second lens group has a positive refractive power. The third lens group has a positive refractive power. The fourth lens group has a negative refractive power. The second, third and fourth lens groups move interrelatedly so as to continuously vary the power of the zoom lens and to correct movement of an image plane caused by the continuous varying of the power of the zoom lens. The fifth lens group has a positive refractive power. The fifth lens group is fixed during the varying of the power of the zoom lens. The first lens group includes a glass lens and a plastic lens in order from the magnification side. The glass lens has a convex surface of a negative meniscus shape, which is directed toward the magnification side. The plastic lens has a convex surface of a negative meniscus plane, which is directed toward the magnification side. At least one surface of the plastic lens is an aspheric surface. The glass lens satisfies:

$$1.56 < Nd < 1.80 \quad (1)$$

$$vd > 45 \quad (2)$$

where Nd denotes refractive index with respect to d-line, and vd denotes Abbe number with respect to d-line.

Also, each of the second lens group, the third lens group and the fourth lens group may include only spherical lenses.

Also, the fourth lens group may include a negative lens and a cemented lens in order from the magnification side. The cemented lens is formed by joining another negative lens and a positive lens.

Also, the second and third lens groups may move to the magnification side during the varying of the power of the zoom lens from a wide-angle end to a telephoto end.

Also, the second and third lens groups may satisfy:

$$1.0 < F2/F < 2.0 \quad (3)$$

$$2.0 < F3/F < 7.0 \quad (4)$$

where F denotes a focal length of a total lens system at a wide-angle end, F2 denotes a focal length of the second lens group, and F3 denotes a focal length of the third lens group.

Also, the second lens group may include two positive lenses.

Also, the fourth lens group may include a single positive lens disposed on a most reduction side. The fifth lens group may include one positive lens.

Also, the positive lens of the fourth lens group disposed on the most reduction side may have at least one aspheric surface and be made of a plastic lens.

Also, the fourth lens group may satisfy:

$$F4/F < -1.0 \quad (5)$$

where F denotes a focal length of a total lens system at a wide-angle end, and F4 denotes a focal length of the fourth lens group.

Also, the fifth lens group may include a positive lens made of plastic and a positive lens made of glass in order from the magnification side.

According to another aspect of the invention, A projection display device includes a light source, a light valve and a projection lens that projects an optical image, which is formed by light modulated by the light valve, on a screen. The projection lens comprises any of the zoom lenses set forth above.

According to the configuration set forth above, such a zoom lens of the five lens groups can be obtained that the zoom lens is bright and has a wide angle of view and that the first lens group has the negative refractive power. Also, the first lens group having the negative refractive power includes the two negative meniscus lenses whose convex surfaces are directed to the magnification side, respectively. The glass and the plastic are selected as the material of the lenses of the first lens group sequentially from the magnification side. Since the two lenses are formed respectively to have the negative meniscus shape and have convex surfaces directed to the magnification side, the convex lens surface on the reduction side gets into the concave lens surface on the magnification side. Such a configuration is advantageous to a size reduction in both the lens diameter direction and the lens length direction. In addition, since the negative meniscus lens made of glass satisfies the conditional expressions (1) and (2), a weight reduction can be attained and various aberrations, especially the lateral color, can be corrected satisfactorily. Also, since the glass is selected as the material of the lens located on the outermost side and exposed to the external environment, the weather resistance can be improved. Also, since the negative meniscus lens made of plastic is effective in reducing a weight and a cost, the satisfactory distortion correction can be accomplished when this lens is used as the second lens that is not exposed to the external environment and also this lens has an aspheric surface.

The zoom lens of the invention is configured as a five-group-configuration having the first lens group set forth above. Therefore, improvement in a weight reduction, a size reduction, brightness and a wider angle of view can be achieved. Various aberrations can be corrected satisfactorily. Furthermore, the excellent weather resistance can be achieved.

DETAILED DESCRIPTION OF EMBODIMENTS OF THE INVENTION

Figure 1:
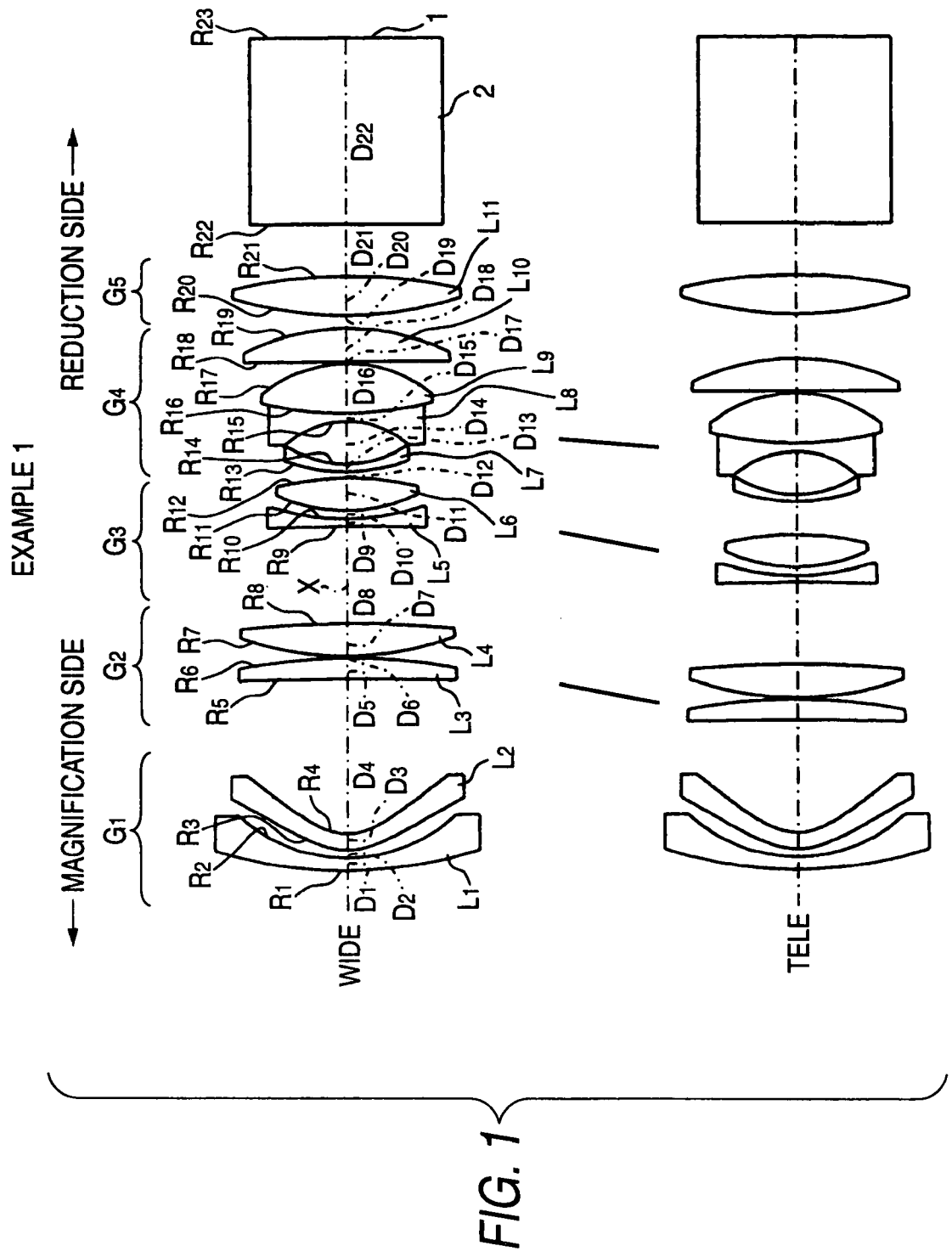
FIG. 1 is a view showing a lens configuration of a wide-angle end and a telephoto end of a zoom lens according to an example 1.

Exemplary embodiments of the invention will be explained with reference to the drawings hereinafter. FIG. 1 shows a basic configuration of a zoom lens according to an example 1 of the invention, and shows a lens configuration at the wide-angle end (WIDE) and a lens configuration at the telephoto end (TELE). The zoom lens according to this example 1 will be described as a representative example of this embodiment.

More particularly, this zoom lens includes first to fifth lens groups $G_1$ to $G_5$ in order from the magnification side. The first lens group $G_1$ has a negative refractive power, and is fixed and executes focusing during varying of a power of the zoom lens. The second lens group $G_2$ has a positive refractive power. The third lens group $G_3$ has a positive refractive power and the fourth lens group $G_4$ has a negative refractive power. The third and fourth lens groups $G_3$ and $G_4$ move interrelatedly to continuously vary the power of the zoom lens and to correct movement of an image plane caused by the continuous varying of the power of the zoom lens. The fifth lens group $G_5$ has a positive refractive power and is fixed during the varying of the power of the zoom lens. A glass block 2 corresponding to a filter for blocking infrared rays, a low-pass filter, and a color synthesis optical system (color separation optical system) may be aligned between the fifth lens group $G_5$ and a display surface 1 of the liquid crystal display device or DMD. Also, "X" in FIG. 1 represents an optical axis.

Here, the first lens group $G_1$ includes a first lens $L_1$ made of a negative meniscus lens whose convex surface is directed to the magnification side, and a second lens $L_2$ made of a negative meniscus lens whose convex surface is directed to the magnification side. The second lens group $G_2$ includes a third lens $L_3$ made of a positive meniscus lens and a fourth lens $L_4$ made of a positive lens. The third lens group $G_3$ includes a fifth lens $L_5$ made of a negative lens and a sixth lens $L_6$ made of a positive lens. The fourth lens group $G_4$ includes a cemented lens formed by joining a seventh lens $L_7$ made of a negative meniscus lens, an eighth lens $L_8$ made of a negative lens and a ninth lens $L_9$ made of a positive lens. The fourth lens group $G_4$ further includes a tenth lens $L_{10}$ made of a positive lens. The fifth lens group $G_5$ includes an eleventh lens $L_{11}$ made of a positive lens.

The first lens group $G_5$ is fixed during the varying of the power and has a focusing function. The second, third, fourth lens groups $G_2$, $G_3$, $G_4$ have functions of (i) varying continuously the power and (ii) correcting movement of an image plane caused by the continuous varying of the power, by moving interrelatedly. Here, the fifth lens group $G_5$ is fixed during the varying of the power and is a relay lens.

Also, since the respective lenses of the second, third, fourth lens groups $G_2$, $G_3$, $G_4$ are formed of the spherical lens, all the moving lens groups are formed of the spherical lens, respectively. As a result, manufacture of this zoom lens can be facilitated as a whole product.

Also, the fourth lens group $G_4$ is configured to have the negative lens and the cemented lens in order from the magnitude side. The cemented lens includes the negative lens and the positive lens. Thus, the fourth lens group $G_4$ can correct satisfactorily the movement of the image plane, the longitudinal chromatic aberration and the lateral color.

Also, the second lens group $G_2$ and the third lens group $G_3$ are configured so as to move to the magnification side during the varying of the power from the wide-angle end to the telephoto end. Thus, a size reduction can be achieved.

Also, the second lens group $G_2$ includes two positive lenses. Thus, the spherical aberration can be corrected satisfactorily.

Also, a single positive lens is disposed on the most reduction side of the fourth lens group $G_4$, and the fifth lens group $G_5$ includes one positive lens. Thus, a size reduction can be achieved.

Also, the positive lens disposed on the outer reduction side of the fourth lens group $G_4$ has at least one aspheric surface, and this lens is made of plastic. Thus, a size reduction can be further achieved.

Also, since the fifth lens group $G_5$ includes the positive lens made of plastic and the positive lens made of glass from the magnification side in order from the magnification side, the number of lenses and an amount of movement of the moving groups can be reduced. As a result, the number of parts of a moving mechanism can be reduced, and a miniaturization in the radius direction can be achieved. Also, because the lens of large diameter is made of plastic, a reduction in weight can be achieved.

Also, the respective aspheric surfaces in this embodiment are given by following aspheric formula.

$$Z = \frac{\frac{Y^2}{R}}{1 + \sqrt{1 - \frac{K \times Y^2}{R^2}}} + \sum_{i=3}^{14} A_i Y^i$$

Where Z: a length of a perpendicular from a point on an aspheric surface at a distance Y from an optical axis to a tangent plane (a plane perpendicular to the optical axis) of an aspheric vertex Y: a distance from the optical axis R: a radius of curvature of the aspheric surface near the optical axis K: eccentricity $A_i$: aspheric coefficient (i=3 to 14)

Also, this embodiment satisfies the following conditional expressions (1) to (5).

$1.56 < Nd < 1.80$            (1)

$vd > 45$            (2)

$1.0 < F2/F < 2.0$            (3)

$2.0 < F3/F < 7.0$            (4)

$F4/F < -1.0$            (5)

where Nd: refractive index of the glass lens of the first lens group $G_1$ with respect to d-line vd: Abbe number of the glass lens of the first lens group $G_1$ with respect to d-line F: focal length of the total lens system at the wide-angle end F2: focal length of the second lens group F3: focal length of the third lens group F4: focal length of the fourth lens group Here, the technical meanings of the conditional expressions (1) to (5) will be described hereunder.

The conditional expression (1) specifies the refractive index of the glass lens of the first lens $L_1$. When this refractive index exceeds the upper limit of the conditional expression (1), normally a specific gravity of the lens is increased and such lens is disadvantageous to a reduction in weight. Also, in that case, the glass material becomes expensive. Thus, such lens is disadvantageous to a reduction in cost. In contrast, if this refractive index falls below the lower limit of the conditional expression (1), a curvature radius required to obtain a necessary power becomes excessively acute and thus, the aberration correction becomes difficult.

The conditional expression (2) specifies the Abbe number of the glass lens of the first lens $L_1$. When this Abbe number falls below the lower limit of the conditional expression (2), the correction of the lateral color becomes difficult.

The conditional expression (3) specifies the power of the second lens group $G_2$. When this power exceeds the upper limit of the conditional expression (3), a movement amount of the second lens group $G_2$ becomes excessively large. Therefore, a power balance with the other lens groups becomes worse when a reduction in size of this group is intended. As a result, the satisfactory aberration correction becomes difficult. In contrast, when this power falls below the lower limit of the conditional expression (3), an amount of the aberration generated in the second lens group $G_2$ is excessively increased.

The conditional expression (4) specifies the power of the third lens group $G_3$. When this power exceeds the upper limit of the conditional expression (4), a movement amount of the third lens group $G_3$ becomes excessively large. Therefore, a power balance with the other lens groups becomes worse when a reduction in size of this group is intended. As a result, the aberration correction becomes difficult. In contrast, if this power falls below the lower limit of the conditional expression (4), an amount of the aberration generated in the third lens group $G_3$ is excessively increased.

The conditional expression (5) specifies the power of the fourth lens group $G_4$. In other words, if this power exceeds the upper limit of the conditional expression, the negative power of the fourth lens group $G_4$ becomes excessively small and also a movement amount of the fourth lens group $G_4$ becomes excessively large at a time of zooming. Therefore, it becomes necessary to increase the power of the fifth lens group $G_5$ in order not to change a ray locus largely changed in the lens diameter direction at a time of zooming. Also, a power balance with the other lens groups becomes worse. As a result the satisfactory aberration correction becomes difficult.

Also, the projection display device according to an embodiment includes a light source, a light valve, and the above zoom lens. In this projection display device, the zoom lens described above functions as a projection lens to project an optical image, which is formed by light modulated by the light valve, on a screen. For example, in the case of a liquid crystal video projector equipped with the zoom lens shown in FIG. 1, an almost parallel pencil of light is incident from a light source portion (not shown) on the right side of a sheet of the drawing, and is irradiated onto the display surface 1 of the light valve such as a liquid crystal display panel. The pencil of light that bears information of the image projected on the display surface 1 is projected on a screen (not shown) in an enlarged fashion on the left side of the sheet of the drawing by this zoom lens via the glass block 2. FIG. 1 only shows one display surface 1. However, normally the liquid crystal video projector is configured to display the full-color image by separating the pencil of light from the light source into three primary color lights RGB by means of the color separation optical system made of a dichroic mirror, and then providing three display surfaces 1 for three primary colors. The glass block 2 can be formed as a dichroic prism that synthesizes three primary colors of light.

EXAMPLES

Respective examples will be described specifically by using data hereunder.

Example 1

The zoom lens according to this example 1 is configured as shown in FIG. 1, as described above. More particularly, this zoom lens is configured sequentially from the magnification side in such a way that the first lens group $G_1$ includes the first lens $L_1$ made of the negative meniscus lens whose convex surface is directed to the magnification side and the second lens $L_2$ made of the negative meniscus lens whose convex surface is directed to the magnification side; the second lens group $G_2$ includes the third lens $L_3$ made of the positive meniscus lens whose convex surface is directed to the reduction side and the fourth lens $L_4$ made of a biconvex lens; the third lens group $G_3$ includes the fifth lens $L_5$ made of a biconcave lens and the sixth lens $L_6$ made of a biconvex lens; the fourth lens group $G_4$ includes the cemented lens constructed formed by joining the seventh lens $L_7$ made of the negative meniscus lens whose convex surface is directed to the magnification side, the eighth lens $L_8$ made of a biconcave lens, and the ninth lens $L_9$ made of a biconvex lens, and the tenth lens $L_{10}$ made of a plano-convex lens; and the fifth lens group $G_5$ includes the eleventh lens $L_{11}$ made of a biconvex lens.

In this example 1, radii R of curvature of the respective lens surfaces (normalized under the assumption that the focal length of the total lens system on the wide-angle end is set to 1; the same rule applies to the following tables), center thicknesses of the respective lenses and air distances D between the respective lens (normalized by the same focal length as the radius R of curvature; the same rule applies to the following tables), refractive indices Nd of the of respective lenses with respect to d-line and Abbe numbers vd of the respective lenses with respect to d-line are given on the upper portion of the table 1. In this table 1 and tables 3, 5, 7, 9 described later, numerical values corresponding to the respective symbols R, D, Nd, and vd are given to increase sequentially from the magnification side.

Also, a distance $D_4$ between the first lens group $G_1$ and the second lens group $G_2$, a distance $D_8$ between the second lens group $G_2$ and the third lens group $G_3$, a distance $D_{12}$ between the third lens group $G_3$ and the fourth lens group $G_4$, a distance $D_{19}$ between the fourth lens group $G_4$ and the fifth lens group $G_5$ and focal lengths f in respective positions, that is, at the wide-angle end (WIDE), the middle end (MIDDLE), and the telephoto end (TELE) are given on the middle portion of the table 1. Also, the numerical values corresponding to the conditional expressions (1) to (5) in the example 1 are given on the lower portion of the table 1.

TABLE 1

| Surface | R | D | Nd | vd |
|---|---|---|---|---|
| 1 | 2.901 | 0.088 | 1.71300 | 53.9 |
| 2 | 1.069 | 0.053 | | |
| *3 | 0.479 | 0.113 | 1.53159 | 55.4 |
| *4 | 0.372 | Variable (D4) | | |
| 5 | −43.168 | 0.141 | 1.83400 | 37.2 |
| 6 | −3.935 | 0.010 | | |
| 7 | 2.115 | 0.226 | 1.77250 | 49.6 |
| 8 | −7.411 | Variable (D8) | | |
| 9 | −18.698 | 0.049 | 1.51742 | 52.4 |
| 10 | 1.570 | 0.059 | | |
| 11 | 1.125 | 0.219 | 1.48749 | 70.2 |
| 12 | −2.055 | Variable (D12) | | |
| 13 | 1.258 | 0.049 | 1.71300 | 53.9 |
| 14 | 0.758 | 0.287 | | |
| 15 | −0.633 | 0.054 | 1.75520 | 27.5 |
| 16 | 2.350 | 0.345 | 1.48749 | 70.2 |
| 17 | −0.900 | 0.010 | | |
| 18 | ∞ | 0.228 | 1.77250 | 49.6 |
| 19 | −1.577 | Variable (D19) | | |
| 20 | 2.591 | 0.262 | 1.71300 | 53.9 |
| 21 | −3.585 | 0.344 | | |
| 22 | ∞ | 1.252 | 1.51633 | 64.1 |
| 23 | ∞ | | | |

*represents aspherical surface

| | Zoom ratio | D4 | D8 | D12 | D19 | f |
|---|---|---|---|---|---|---|
| wide | 1.00 | 1.042 | 0.661 | 0.042 | 0.089 | 0.994 |
| middle | 1.10 | 0.891 | 0.608 | 0.127 | 0.209 | 1.090 |
| telephoto | 1.20 | 0.753 | 0.555 | 0.223 | 0.302 | 1.194 |

| Reduction ratio | −0.0100 |
|---|---|
| Conditional expression (1) Nd | 1.71300 |
| Conditional expression (2) vd | 53.9 |

TABLE 1-continued

| Conditional expression (3) F2 | 1.520 |
|---|---|
| Conditional expression (4) F3 | 3.073 |
| Conditional expression (5) F4 | −8.080 |
| F | 1.000 |

F: focal distance of the entire system when the conjugate distance on the magnification side is Also, the third surface and the fourth surface are formed of the aspherical surface. In the table 2, values of respective constants K, $A_3$, $A_4$, $A_5$, $A_6$, $A_7$, $A_8$, $A_9$, $A_{10}$, $A_{11}$, $A_{12}$, $A_{13}$, $A_{14}$ for these aspheric surfaces in the aspheric formula are given.

TABLE 2

| | Surface number | |
|---|---|---|
| | 3 | 4 |
| K | −1.4875708 | −0.1981091 |
| $A_3$ | 0.0000000 | 0.0000000 |
| $A_4$ | 1.4707017 | $3.1760446 \times 10^{-1}$ |
| $A_5$ | −5.7414626 | −9.8776861 |
| $A_6$ | 4.7837822 | $2.3014130 \times 10$ |
| $A_7$ | −1.3315050 | $-1.7925391 \times 10$ |
| $A_8$ | $1.6326400 \times 10$ | $4.9395198 \times 10^{-1}$ |
| $A_9$ | $-3.2633208 \times 10$ | 3.1193861 |
| $A_{10}$ | $1.4725443 \times 10$ | 2.0634507 |
| $A_{11}$ | 7.4637088 | −1.8425242 |
| $A_{12}$ | −3.1650244 | $5.3985866 \times 10^{-1}$ |
| $A_{13}$ | −2.0178408 | $-1.8507288 \times 10^{-1}$ |
| $A_{14}$ | $7.3569086 \times 10^{-3}$ | $-2.7933799 \times 10^{-4}$ |

Figure 6:
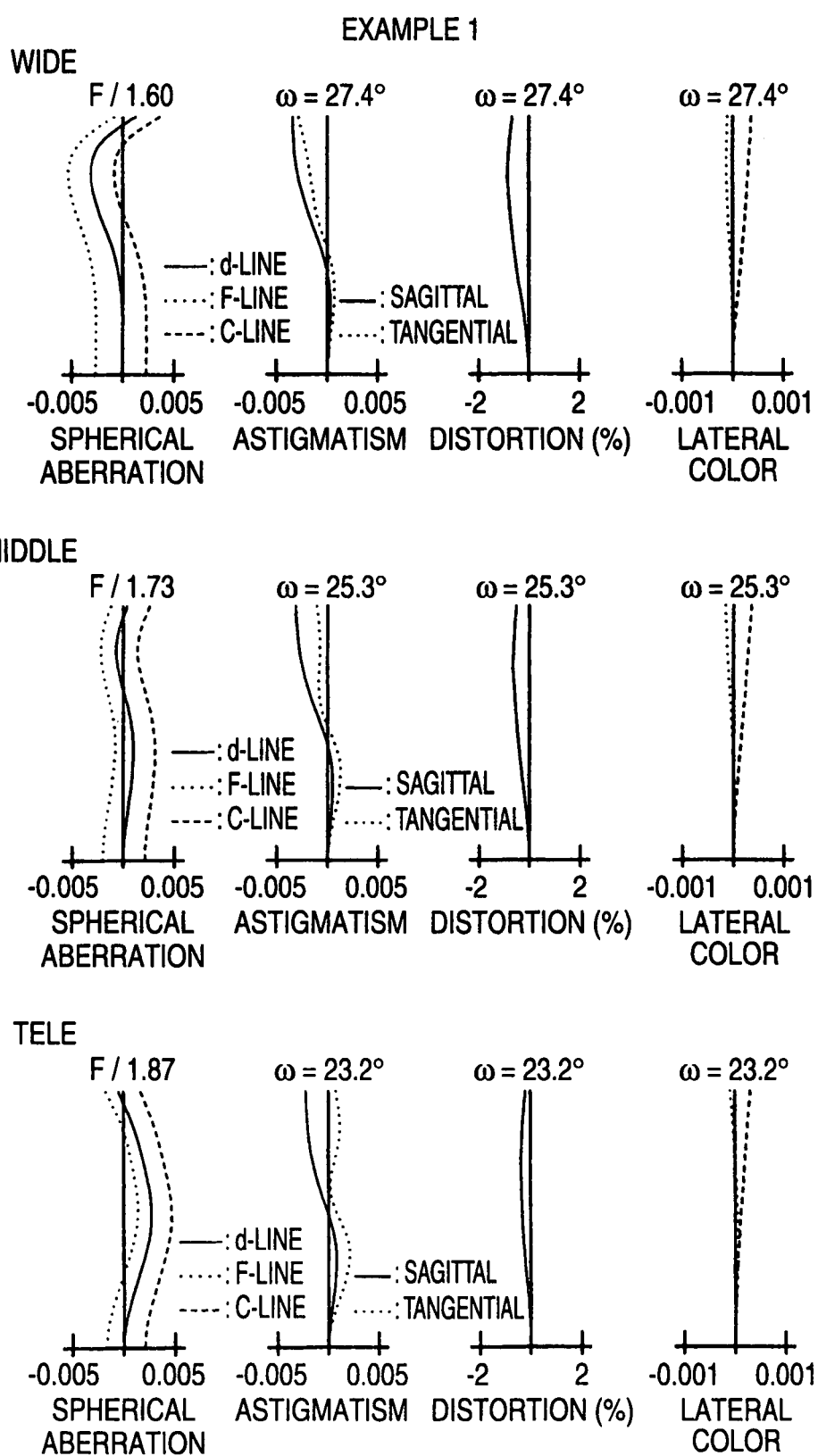
FIG. 6 shows charts of respective aberrations at a wide-angle end, a middle end, and a telephoto end of the zoom lens according to the example 1.

FIG. 6 is aberration charts showing various aberrations (spherical aberration, astigmatism, distortion, and lateral color) at the wide-angle end (WIDE), the middle end (MIDDLE), and the telephoto end (TELE) of the zoom lens according to the example 1. In FIG. 6 and in subsequent FIGS. 7 to 10, a sagittal image surface and a tangential image surface are shown in each astigmatism chart, and aberrations on the F line and the C line with respect to the d line are shown in each chromatic-aberration-of-magnification chart.

As apparent from FIG. 6, according to the zoom lens of the example 1, a good aberration correction can be made over the full zoom range while keeping the wide angle of view. In addition, FNo at the wide-angle end is 1.60, which gives a brighter zoom lens.

Also, the zoom lens of the example 1 satisfies all the conditional expressions (1) to (5) as shown in the lower portion of the table 1.

Example 2

Figure 2:
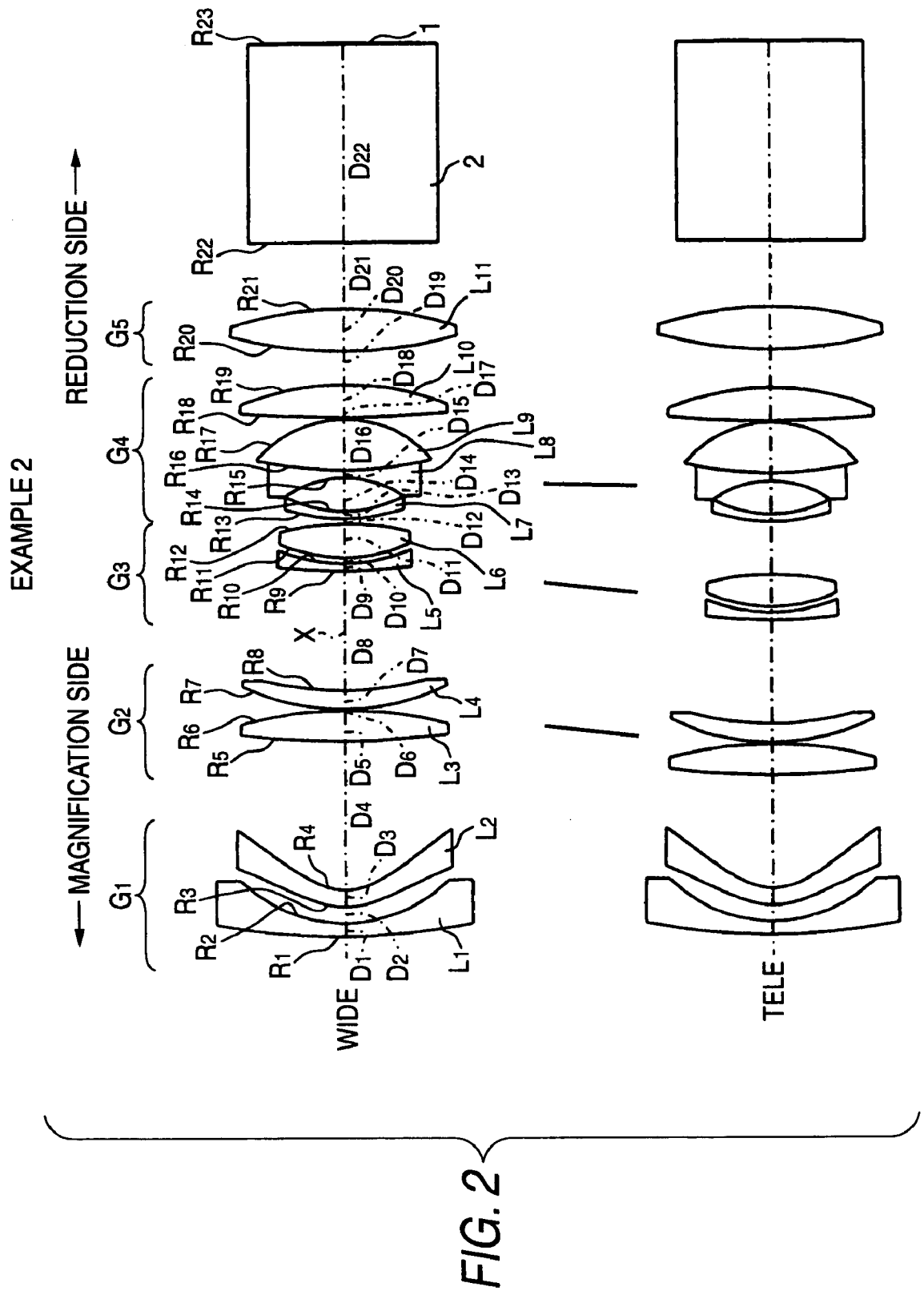
FIG. 2 is a view showing a lens configuration of a wide-angle end and a telephoto end of a zoom lens according to an example 2.

FIG. 2 shows a schematic configuration of a zoom lens according to an example 2. The zoom lens of the example 2 is configured substantially similarly to that of the example 1. A major difference from the example 1 is that the third lens $L_3$ is made of a biconvex lens, that the fourth lens $L_4$ is made of a positive meniscus lens whose convex surface is directed to the magnification side, that the fifth lens $L_5$ is made of a negative meniscus lens whose convex surface is directed to the magnification side, and that the tenth lens $L_{10}$ is made of a biconvex lens.

In this example 2, radii R of curvature of the respective lens surfaces, center thicknesses of the respective lenses and air distances D between the respective lens, refractive indices Nd of the respective lenses with respect to d-line and Abbe numbers vd of the respective lenses with respective to d-line are given on the upper portion of a table 3.

Also, the distance $D_4$ between the first lens group $G_1$ and the second lens group $G_2$, the distance $D_8$ between the second lens group $G_2$ and the third lens group $G_3$, the distance $D_{12}$ between the third lens group $G_3$ and the fourth lens group $G_4$, the distance $D_{19}$ between the fourth lens group $G_4$ and the fifth lens group $G_5$, and the focal length f in respective positions, that is, at the wide-angle end (WIDE), the middle end (MIDDLE), and the telephoto end (TELE) are given on the middle portion of the table 3. Also, the numerical values corresponding to the conditional expressions (1) to (5) in the embodiment 2 are given on the lower portion of the table 3.

TABLE 3

| Surface | R | D | Nd | vd |
|---|---|---|---|---|
| 1 | 4.710 | 0.095 | 1.56384 | 60.7 |
| 2 | 1.039 | 0.115 | | |
| *3 | 0.547 | 0.121 | 1.53159 | 55.4 |
| *4 | 0.388 | Variable (D4) | | |
| 5 | 5.450 | 0.217 | 1.83400 | 37.2 |
| 6 | −2.867 | 0.011 | | |
| 7 | 1.627 | 0.134 | 1.77250 | 49.6 |
| 8 | 2.232 | Variable (D8) | | |
| 9 | 3.870 | 0.053 | 1.69895 | 30.1 |
| 10 | 1.213 | 0.041 | | |
| 11 | 1.121 | 0.235 | 1.48749 | 70.2 |
| 12 | −1.915 | Variable (D12) | | |
| 13 | 1.372 | 0.053 | 1.62041 | 60.3 |
| 14 | 0.882 | 0.235 | | |
| 15 | −0.746 | 0.058 | 1.83400 | 37.2 |
| 16 | 2.716 | 0.362 | 1.49700 | 81.6 |
| 17 | −0.820 | 0.011 | | |
| 18 | 8.150 | 0.232 | 1.56384 | 60.7 |
| 19 | −2.018 | Variable (D19) | | |
| 20 | 2.969 | 0.304 | 1.62041 | 60.3 |
| 21 | −2.652 | 0.468 | | |
| 22 | ∞ | 1.419 | 1.51633 | 64.1 |
| 23 | ∞ | | | |

*represents aspherical surface

| | Zoom ratio | D4 | D8 | D12 | D19 | f |
|---|---|---|---|---|---|---|
| wide | 1.00 | 1.053 | 0.865 | 0.037 | 0.235 | 0.996 |
| middle | 1.10 | 0.922 | 0.810 | 0.193 | 0.265 | 1.091 |
| telephoto | 1.20 | 0.802 | 0.748 | 0.367 | 0.273 | 1.196 |

| Reduction ratio | −0.0104 |
|---|---|
| Conditional expression (1) Nd | 1.56384 |
| Conditional expression (2) vd | 60.7 |
| Conditional expression (3) F2 | 1.692 |
| Conditional expression (4) F3 | 3.320 |
| Conditional expression (5) F4 | −8.043 |
| F | 1.000 |

F: focal distance of the entire system when the conjugate distance on the magnification side is Also, the third surface and the fourth surface are formed of the aspherical surface. In the table 4, values of respective constants K, $A_3$, $A_4$, $A_5$, $A_6$, $A_7$, $A_8$, $A_9$, $A_{10}$, $A_{11}$, $A_{12}$, $A_{13}$, $A_{14}$ for these aspheric surfaces in the aspheric formula are given.

| | Surface number | |
|---|---|---|
| | 3 | 4 |
| K | −2.7088768 | −1.0633418 |
| $A_3$ | 0.0000000 | 0.0000000 |

-continued

| | Surface number | |
|---|---|---|
| | 3 | 4 |
| $A_4$ | 1.4443614 | 1.4583878 |
| $A_5$ | −5.1486611 | −7.1311892 |
| $A_6$ | 4.8952889 | $1.3153565 \times 10$ |
| $A_7$ | −1.3587737 | $−1.1532876 \times 10$ |
| $A_8$ | 8.6326766 | 2.7807564 |
| $A_9$ | $−1.9324393 \times 10$ | 3.4181175 |
| $A_{10}$ | 9.5706145 | $−5.5736760 \times 10^{-2}$ |
| $A_{11}$ | 6.1221299 | −4.3143887 |
| $A_{12}$ | −2.1023394 | −1.1820246 |
| $A_{13}$ | −6.6090427 | 4.1130515 |
| $A_{14}$ | 3.8918095 | $−4.2767591 \times 10^{-1}$ |

Figure 7:
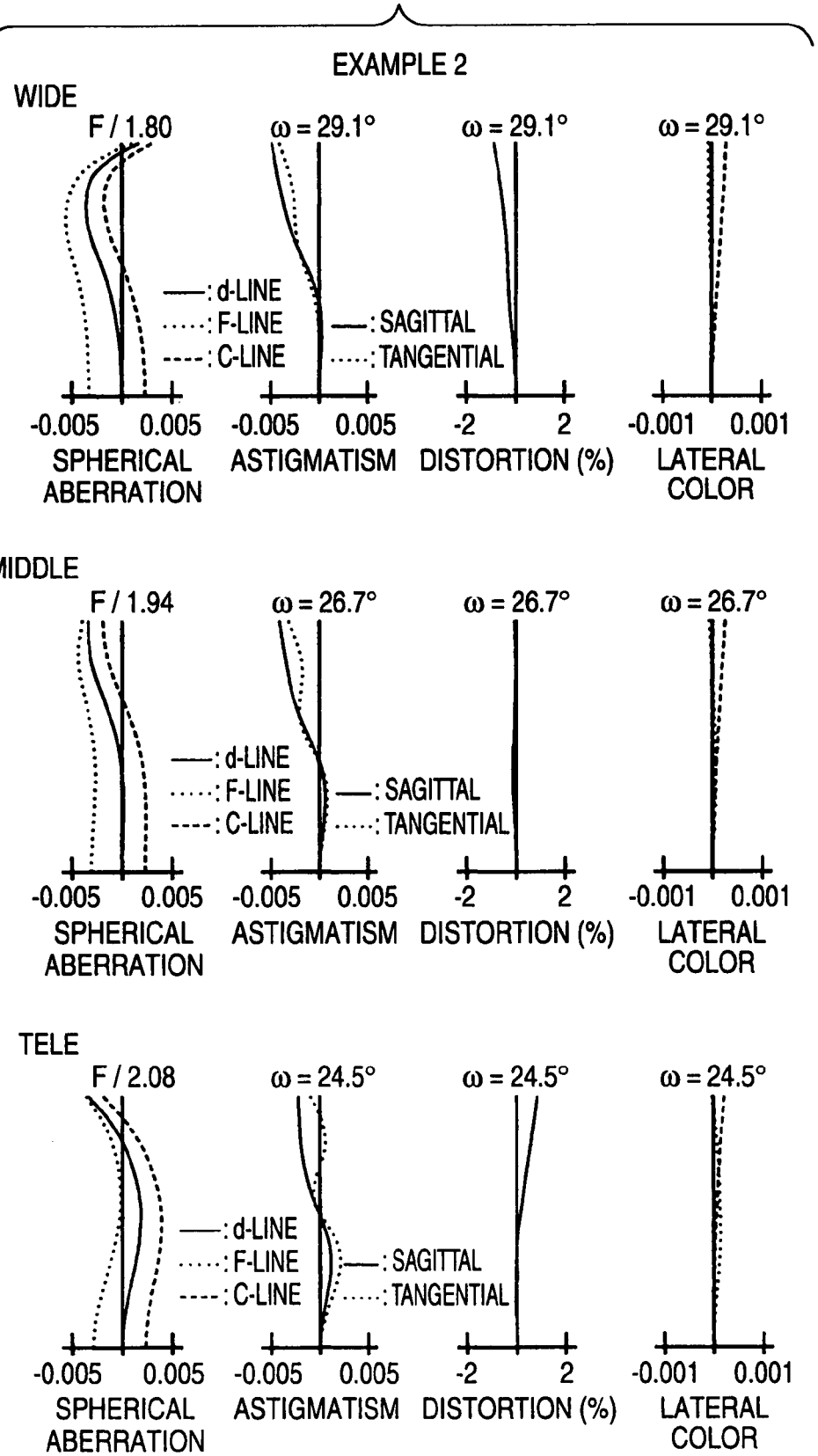
FIG. 7 shows charts of respective aberrations at a wide-angle end, a middle end, and a telephoto end of the zoom lens according to the example 2.

FIG. 7 is aberration charts showing various aberrations (spherical aberration, astigmatism, distortion and lateral color) at the wide-angle end (WIDE), the middle end (MIDDLE), and the telephoto end (TELE) of the zoom lens according to the example 2.

As apparent from FIG. 7, according to the zoom lens of the example 2, a good aberration correction can be made over the full zoom range while keeping the wide angle of view. In addition, FNo at the wide-angle end is 1.80, which gives a brighter zoom lens.

Also, the zoom lens of the example 2 satisfies all the conditional expressions (1) to (5) as shown in the lower portion of the table 3.

Example 3

Figure 3:
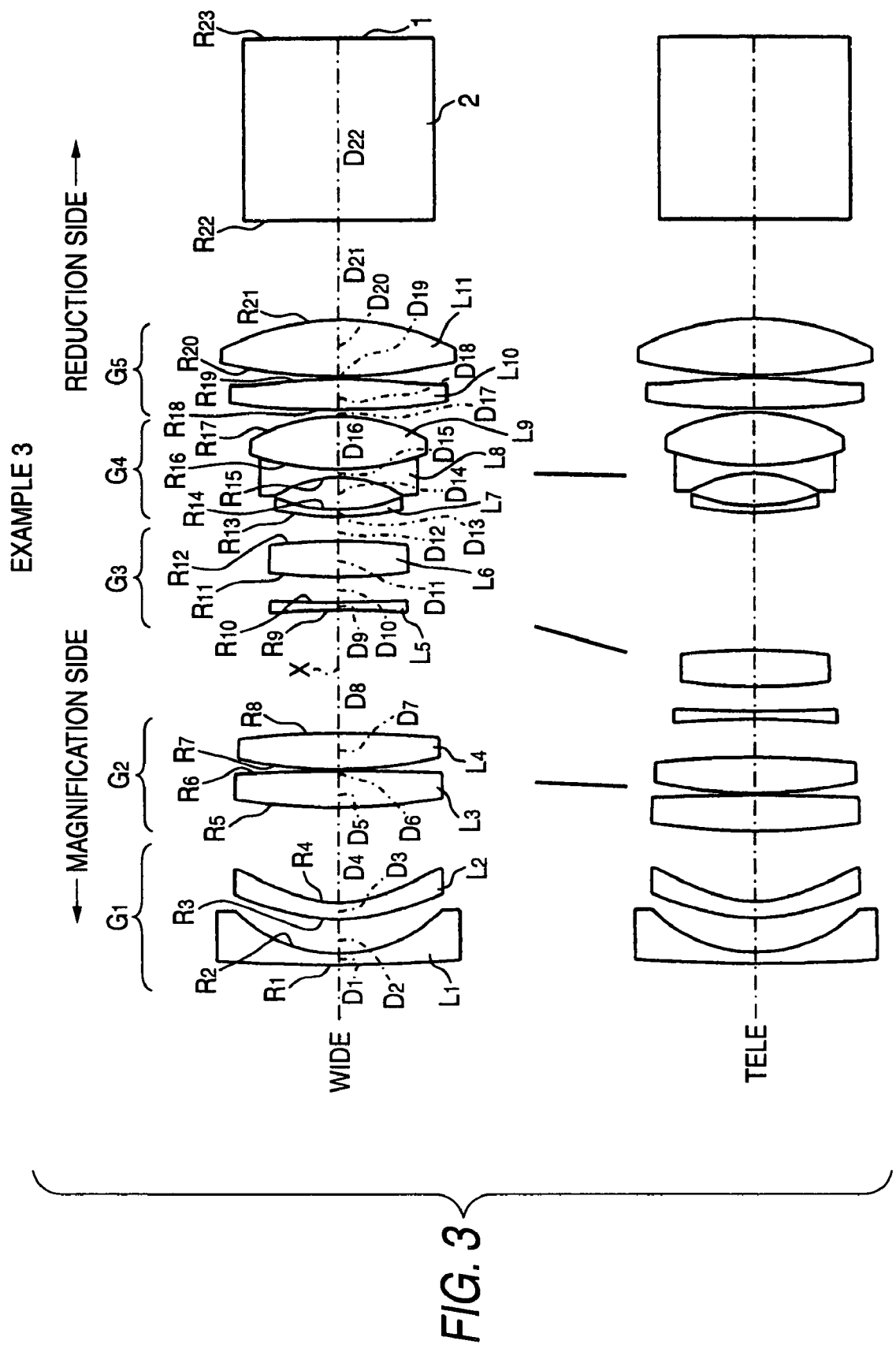
FIG. 3 is a view showing a lens configuration of a wide-angle end and a telephoto end of a zoom lens according to an example 3.

FIG. 3 shows a schematic configuration of a zoom lens according to an example 3. The zoom lens according to the example 3 is configured substantially similarly to that according to the example 1, but is different from the example 1 mainly in that the fourth lens group $G_4$ includes three lenses and the fifth lens group $G_5$ includes two lenses. More particularly, this zoom lens is configured sequentially from the magnification side in such a way that the first lens group $G_1$ includes the first lens $L_1$ made of a negative meniscus lens whose convex surface is directed to the magnification side and the second lens $L_2$ made of a negative meniscus lens whose convex surface is directed to the magnification side; the second lens group $G_2$ includes the third lens $L_3$ made of a biconvex lens and the fourth lens $L_4$ made of a biconvex lens; the third lens group $G_3$ includes the fifth lens $L_5$ made of a biconcave lens and the sixth lens $L_6$ made of a biconvex lens; the fourth lens group $G_4$ includes the cemented lens configured by joining the seventh lens $L_7$ made of a negative meniscus lens whose convex surface is directed to the magnification side, the eighth lens $L_8$ made of a biconcave lens, and the ninth lens $L_9$ made of a biconvex lens; and the fifth lens group $G_5$ includes the tenth lens $L_{10}$ made of a biconvex lens and the eleventh lens $L_{11}$ made of a biconvex lens.

In this example 3, radii R of curvature of respective lens surfaces, center thicknesses of respective lenses and air distances D between respective lenses, refractive indices Nd of the respective lenses with respect to d-line and Abbe numbers vd of the respective lenses with respect to d-line are given on the upper portion of a table 5. Also, the distance $D_4$ between the first lens group $G_1$ and the second lens group $G_2$, the distance $D_8$ between the second lens group $G_2$ and the third lens group $G_3$, the distance $D_{12}$ between the third lens group $G_3$ and the fourth lens group $G_4$, a distance $D_{17}$ between the fourth lens group $G_4$ and the fifth lens group $G_5$, and the focal length f in respective positions, that is, at the wide-angle end (WIDE), the middle end (MIDDLE), and the telephoto end (TELE) are given on the middle portion of the table 5. Also, the numerical values corresponding to the conditional expressions (1) to (5) in the example 3 are given on the lower portion of the table 5.

TABLE 5

| Surface | R | D | Nd | vd |
|---|---|---|---|---|
| 1 | 12.482 | 0.079 | 1.62299 | 58.2 |
| 2 | 1.058 | 0.256 | | |
| *3 | 1.189 | 0.122 | 1.53039 | 55.2 |
| *4 | 0.782 | Variable (D4) | | |
| 5 | 4.656 | 0.265 | 1.80610 | 40.9 |
| 6 | −16.922 | 0.011 | | |
| 7 | 3.245 | 0.265 | 1.80610 | 40.9 |
| 8 | −7.224 | Variable (D8) | | |
| 9 | −6.434 | 0.058 | 1.78472 | 25.7 |
| 10 | 12.612 | 0.182 | | |
| 11 | 4.120 | 0.265 | 1.71300 | 53.9 |
| 12 | −4.459 | Variable (D12) | | |
| 13 | 2.185 | 0.053 | 1.62299 | 58.2 |
| 14 | 1.296 | 0.235 | | |
| 15 | −0.894 | 0.058 | 1.69895 | 30.1 |
| 16 | 1.961 | 0.385 | 1.62041 | 60.3 |
| 17 | −1.301 | 可变(D17) | | |
| *18 | 7.847 | 0.224 | 1.53039 | 55.2 |
| *19 | −3.563 | Variable (D19) | | |
| 20 | 3.598 | 0.416 | 1.62041 | 60.3 |
| 21 | −1.842 | 0.715 | | |
| 22 | ∞ | 1.313 | 1.51633 | 64.1 |
| 23 | ∞ | | | |

*represents aspherical surface

| Zoom ratio | D4 | D8 | D12 | D17 | f |
|---|---|---|---|---|---|
| wide | 1.00 | 0.700 | 0.897 | 0.177 | 0.053 | 0.997 |
| middle | 1.10 | 0.598 | 0.578 | 0.601 | 0.048 | 1.092 |
| telephoto | 1.20 | 0.515 | 0.276 | 1.002 | 0.033 | 1.197 |

| Reduction ratio | −0.0103 |
|---|---|
| Conditional expression (1) Nd | 1.62299 |
| Conditional expression (2) vd | 58.2 |
| Conditional expression (3) F2 | 1.770 |
| Conditional expression (4) F3 | 6.212 |
| Conditional expression (5) F4 | −2.377 |
| F | 1.000 |

F: focal distance of the entire system when the conjugate distance on the magnification side is Also, the third surface, the fourth surface, the eighteenth surface and the nineteenth surface are formed of the aspherical surface. In a table 6, values of respective constants K, $A_3$, $A_4$, $A_5$, $A_6$, $A_7$, $A_8$ for these aspheric surfaces in the aspheric formula are given.

TABLE 6

| | Surface number | | | |
|---|---|---|---|---|
| | 3 | 4 | 18 | 19 |
| K | −5.0000298 | −0.6568687 | −4.9956237 | 3.2751599 |
| $A_3$ | $-2.8654115 \times 10^{-3}$ | $1.5666550 \times 10^{-2}$ | 0.0000000 | 0.0000000 |
| $A_4$ | $-8.5466024 \times 10^{-2}$ | $-6.7334943 \times 10^{-1}$ | $1.9317201 \times 10^{-2}$ | $1.0541612 \times 10^{-1}$ |
| $A_5$ | $-2.1926182 \times 10^{-2}$ | 1.0117742 | $1.7312138 \times 10^{-2}$ | $-4.7545677 \times 10^{-2}$ |
| $A_6$ | $7.3061984 \times 10^{-1}$ | $-4.4457365 \times 10^{-1}$ | $2.5758225 \times 10^{-2}$ | $9.5354593 \times 10^{-2}$ |
| $A_7$ | −1.0333070 | $-1.8182238 \times 10^{-1}$ | $1.7343697 \times 10^{-2}$ | $4.8945297 \times 10^{-2}$ |
| $A_8$ | $4.6909851 \times 10^{-1}$ | $1.1158279 \times 10^{-1}$ | $-2.4964598 \times 10^{-2}$ | $-5.7074197 \times 10^{-2}$ |

Figure 8:
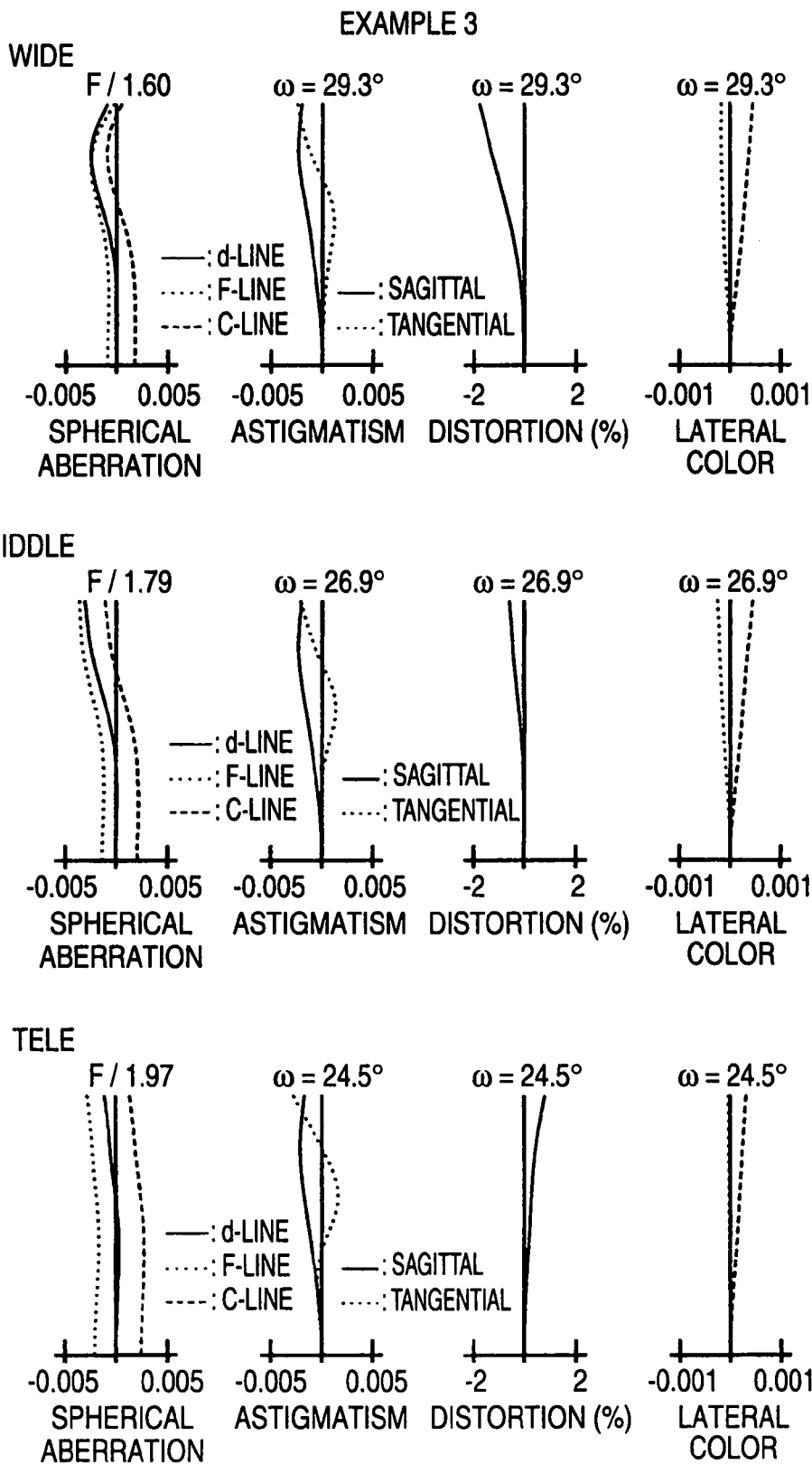
FIG. 8 shows charts of respective aberrations at a wide-angle end, a middle end, and a telephoto end of the zoom lens according to the example 3.

FIG. 8 is aberration charts showing various aberrations (spherical aberration, astigmatism, distortion, and lateral color) at the wide-angle end (WIDE), the middle end (MIDDLE), and the telephoto end (TELE) of the zoom lens according to the example 3.

As apparent from FIG. 8, according to the zoom lens of the example 3, a good aberration correction can be made over the full zoom range while keeping the wide angle of view. In addition, FNo at the wide-angle end is 1.60, which gives a brighter zoom lens.

Also, the zoom lens of the example 3 satisfies all the conditional expressions (1) to (5) as shown in the lower portion of the table 5.

Example 4

Figure 4:
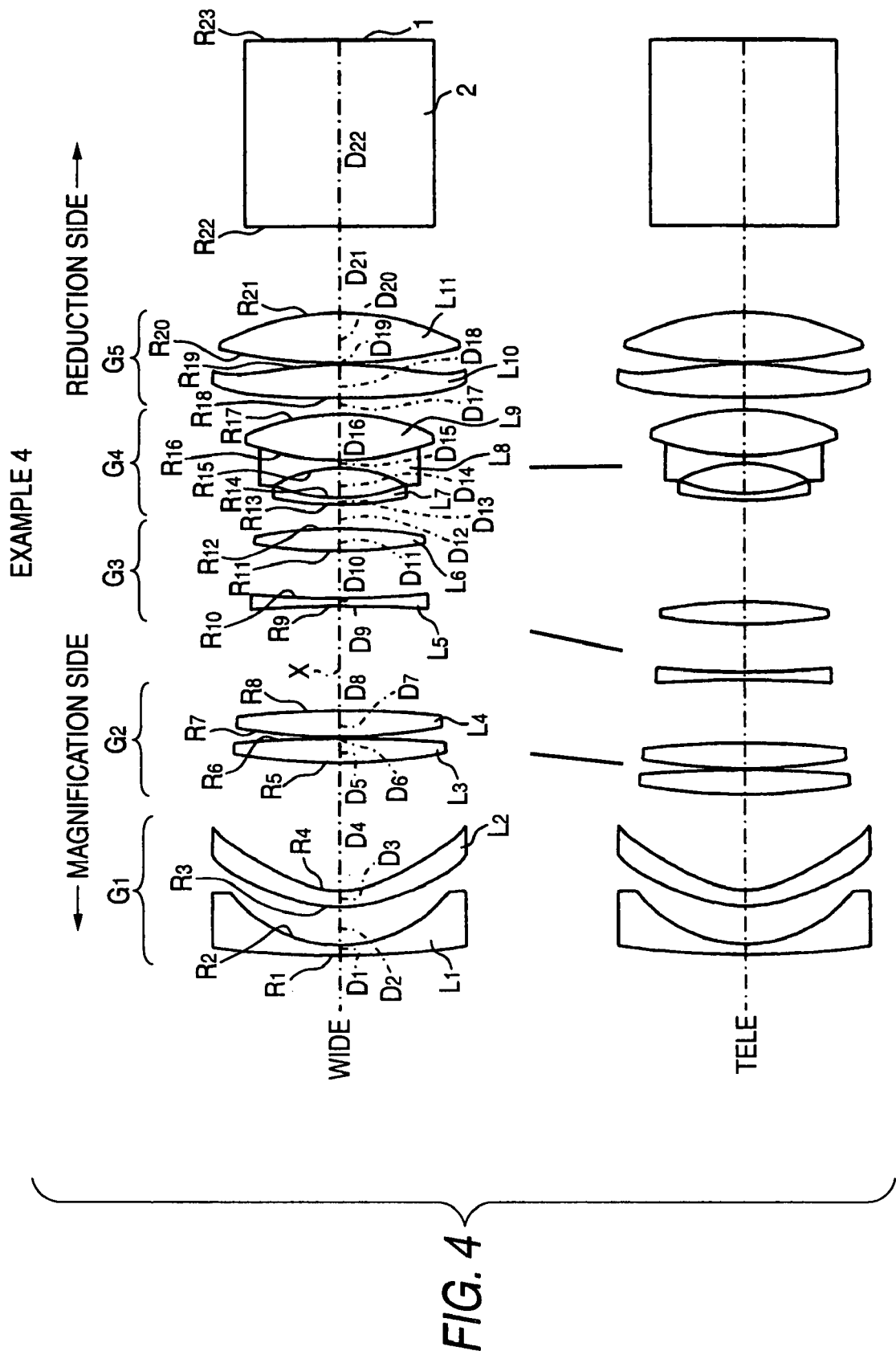
FIG. 4 is a view showing a lens configuration of a wide-angle end and a telephoto end of a zoom lens according to an example 4.

FIG. 4 shows a schematic configuration of a zoom lens according to an example 4. The zoom lens according to the example 4 is configured substantially similarly to that according to the example 3.

In this example 4, radii R of curvature of respective lens surfaces, center thicknesses of respective lenses and air distances D between respective lenses, refractive indices Nd of the respective lenses with respect to d-line and Abbe numbers vd of the respective lenses with respective to d-line are given on the upper portion of a table 7.

Also, the distance $D_4$ between the first lens group $G_1$ and the second lens group $G_2$, the distance $D_8$ between the second lens group $G_2$ and the third lens group $G_3$, the distance $D_{12}$ between the third lens group $G_3$ and the fourth lens group $G_4$, the distance $D_{17}$ between the fourth lens group $G_4$ and the fifth lens group $G_5$, and the focal length f in respective positions at the wide-angle end (WIDE), the middle end (MIDDLE), and the telephoto end (TELE) are given on the middle portion of the table 7. Also, the numerical values corresponding to the conditional expressions (1) to (5) in the embodiment 4 are given on the lower portion of the table 7.

TABLE 7

| Surface | R | D | Nd | vd |
|---|---|---|---|---|
| 1 | 6.653 | 0.079 | 1.62041 | 60.3 |
| 2 | 1.039 | 0.285 | | |
| *3 | 0.909 | 0.122 | 1.53159 | 55.4 |
| *4 | 0.640 | Variable (D4) | | |
| 5 | 4.502 | 0.184 | 1.83400 | 37.2 |
| 6 | −9.588 | 0.011 | | |
| 7 | 4.124 | 0.192 | 1.78590 | 44.2 |
| 8 | −7.178 | Variable (D8) | | |
| 9 | −9.193 | 0.058 | 1.84666 | 23.8 |
| 10 | 6.307 | 0.360 | | |
| 11 | 3.740 | 0.167 | 1.69680 | 55.5 |
| 12 | −3.399 | Variable (D12) | | |

TABLE 7-continued

| | | | | |
|---|---|---|---|---|
| 13 | 2.361 | 0.053 | 1.58913 | 61.2 |
| 14 | 1.280 | 0.227 | | |
| 15 | −0.984 | 0.058 | 1.69895 | 30.1 |
| 16 | 1.921 | 0.346 | 1.62041 | 60.3 |
| 17 | −1.663 | 可変(D17) | | |
| *18 | 8.487 | 0.248 | 1.53159 | 55.4 |
| *19 | −2.749 | Variable (D19) | | |
| 20 | 3.856 | 0.371 | 1.62041 | 60.3 |
| 21 | −1.936 | 0.643 | | |
| 22 | ∞ | 1.391 | 1.51633 | 64.1 |
| 23 | ∞ | | | |

*represents aspherical surface

| | Zoom ratio | D4 | D8 | D12 | D17 | f |
|---|---|---|---|---|---|---|
| wide | 1.00 | 0.962 | 0.789 | 0.181 | 0.122 | 0.996 |
| middle | 1.10 | 0.826 | 0.625 | 0.482 | 0.120 | 1.092 |
| telephoto | 1.20 | 0.715 | 0.476 | 0.770 | 0.093 | 1.196 |

| Reduction ratio | −0.0103 |
|---|---|
| Conditional expression (1) Nd | 1.62041 |
| Conditional expression (2) vd | 60.3 |
| Conditional expression (3) F2 | 1.780 |
| Conditional expression (4) F3 | 5.051 |
| Conditional expression (5) F4 | −1.941 |
| F | 1.000 |

F: focal distance of the entire system when the conjugate distance on the magnification side is Also, the third surface, the fourth surface, the eighteenth surface, and the nineteenth surface are formed of the aspherical surface. In the table 8, values of respective constants K, $A_3, A_4, A_5, A_6, A_7, A_8, A_9, A_{10}$ for these aspheric surfaces in the aspheric formula are given.

TABLE 8

| | Surface number | | | |
|---|---|---|---|---|
| | 3 | 4 | 18 | 19 |
| K | −2.8879369 | −0.7537870 | −0.5061858 | 1.9415364 |
| $A_3$ | $5.3877776 \times 10^{-2}$ | $9.8741174 \times 10^{-2}$ | 0.0000000 | 0.0000000 |
| $A_4$ | $-2.8640881 \times 10^{-1}$ | $-9.9823750 \times 10^{-1}$ | $5.1671237 \times 10^{-2}$ | $1.0215868 \times 10^{-1}$ |
| $A_5$ | $-1.4059855 \times 10^{-1}$ | 1.3718067 | $-9.9309339 \times 10^{-2}$ | $-2.0234633 \times 10^{-2}$ |
| $A_6$ | 1.2757781 | $-4.1445488 \times 10^{-1}$ | $1.0060856 \times 10^{-1}$ | $-1.4358487 \times 10^{-2}$ |
| $A_7$ | −1.0470261 | $-1.2740256 \times 10^{-1}$ | $3.8960305 \times 10^{-2}$ | $1.2342509 \times 10^{-1}$ |
| $A_8$ | $7.1822822 \times 10^{-3}$ | $2.9208377 \times 10^{-2}$ | $-2.8676380 \times 10^{-2}$ | $-5.4236291 \times 10^{-2}$ |
| $A_9$ | $-1.0928494 \times 10^{-1}$ | $-6.5345847 \times 10^{-1}$ | $1.3189145 \times 10^{-2}$ | $4.6812977 \times 10^{-2}$ |
| $A_{10}$ | $3.5055314 \times 10^{-1}$ | $6.6518209 \times 10^{-1}$ | $8.7113197 \times 10^{-3}$ | $-5.3168623 \times 10^{-3}$ |

Figure 9:
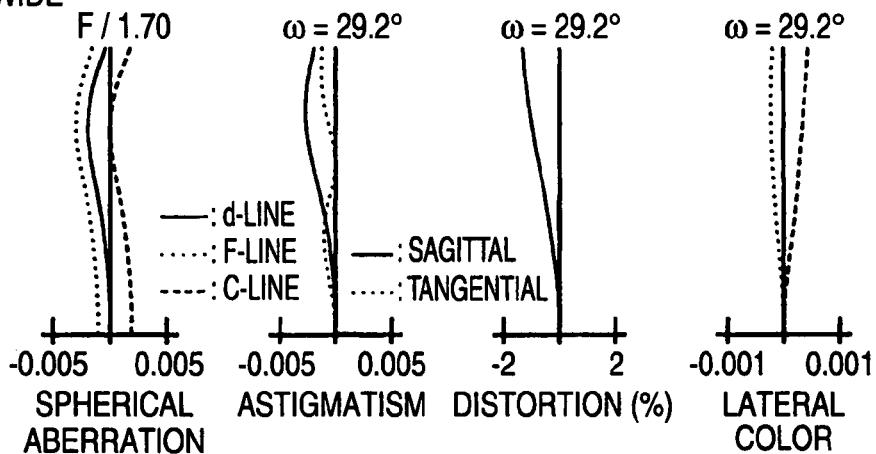
FIG. 9 shows charts of respective aberrations at a wide-angle end, a middle end, and a telephoto end of the zoom lens according to the example 4.
Figure 9:
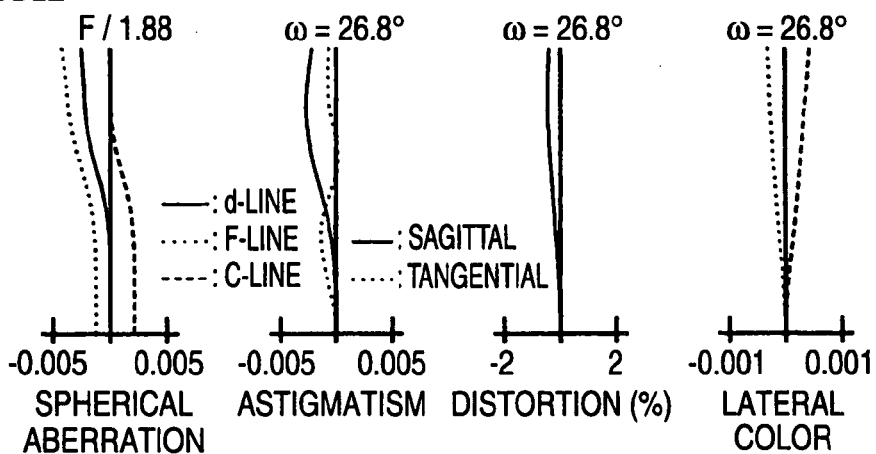
Figure 9:
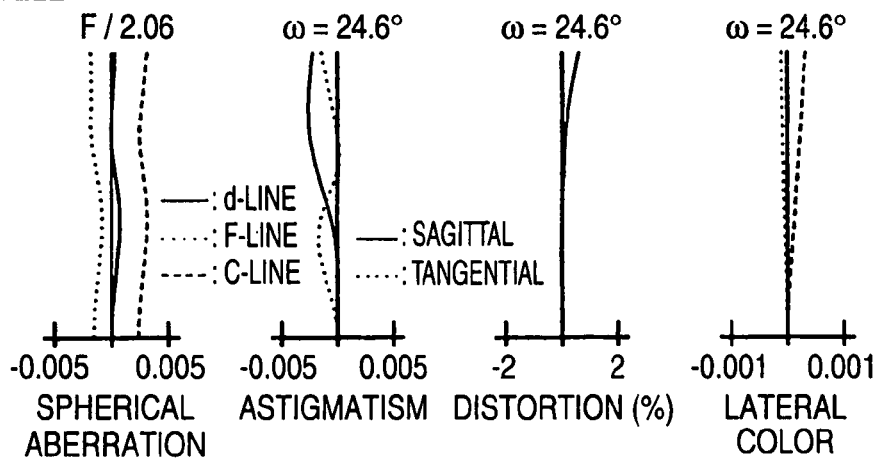

FIG. 9 is aberration charts showing various aberrations (spherical aberration, astigmatism, distortion, and lateral color) at the wide-angle end (WIDE), the middle end (MIDDLE), and the telephoto end (TELE) of the zoom lens according to the example 4.

As apparent from FIG. 9, according to the zoom lens of the example 4, a good aberration correction can be made over the full zoom range while keeping the wide angle of view. In addition, FNo at the wide-angle end is 1.70, which gives a brighter zoom lens.

Also, the zoom lens of the example 4 satisfies all the conditional expressions (1) to (5) as shown in the lower portion of the table 7.

Example 5

Figure 5:
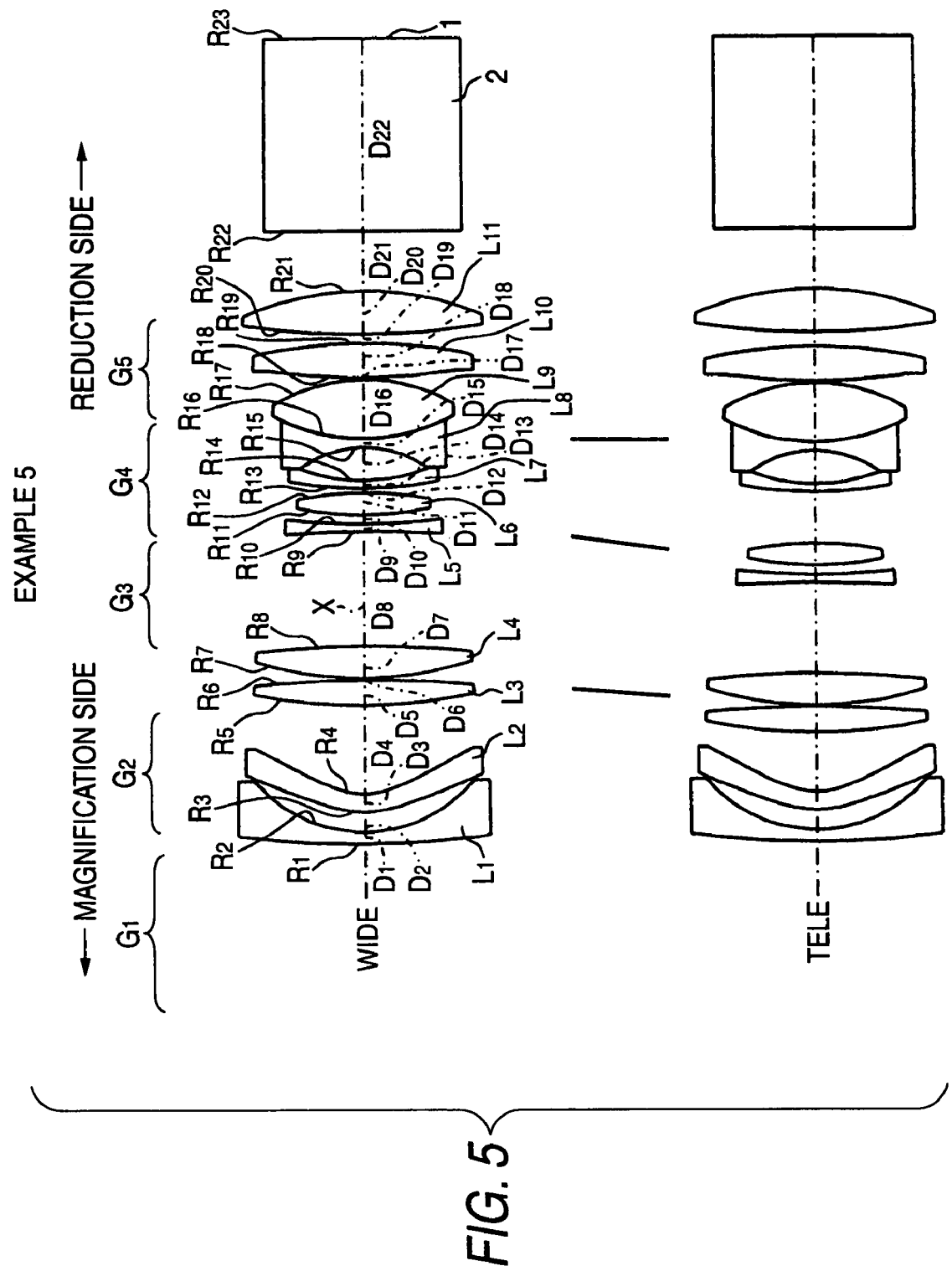
FIG. 5 is a view showing a lens configuration of a wide-angle end and a telephoto end of a zoom lens according to an example 5.

FIG. 5 shows a schematic configuration of a zoom lens according to an example 5. The zoom lens according to the example 5 is configured substantially similarly to that according to that of the example 1. A major difference from the example 1 is that the third lens $L_3$ is made of a biconvex lens and the tenth lens $L_{10}$ is made of a biconvex lens. Also, because the lens in the fourth lens group $G_4$ on the most reduction side is formed of the plastic lens with the aspheric surface, a reduction in weight and a reduction in size can be further achieved.

In this example 5, radii R of curvature of respective lens surfaces, center thicknesses of respective lenses and air distances D between respective lens, refractive indices Nd of the respective lenses with respect to d-line and Abbe numbers vd of the respective lenses with respective to d-line are given on the upper portion of a table 9.

Also, the distance $D_4$ between the first lens group $G_1$ and the second lens group $G_2$, the distance $D_8$ between the second lens group $G_2$ and the third lens group $G_3$, the distance $D_{12}$ between the third lens group $G_3$ and the fourth lens group $G_4$, the distance $D_{19}$ between the fourth lens group $G_4$ and the fifth lens group $G_5$, and the focal length f in respective positions at the wide-angle end (WIDE), the middle end (MIDDLE), and the telephoto end (TELE) are given on the middle portion of the table 9. Also, the numerical values corresponding to the conditional expressions (1) to (5) in the embodiment 5 are given on the lower portion of the table 9.

TABLE 9

| Surface | R | D | Nd | vd |
|---|---|---|---|---|
| 1 | 6.406 | 0.080 | 1.71300 | 53.9 |
| 2 | 0.969 | 0.135 | | |

TABLE 9-continued

| | | | | |
|---|---|---|---|---|
| *3 | 0.676 | 0.122 | 1.53039 | 55.2 |
| *4 | 0.498 | Variable (D4) | | |
| 5 | 3.716 | 0.171 | 1.83400 | 37.2 |
| 6 | −8.077 | 0.011 | | |
| 7 | 2.375 | 0.217 | 1.83400 | 37.2 |
| 8 | −6.713 | Variable (D8) | | |
| 9 | −9.811 | 0.053 | 1.75520 | 27.5 |
| 10 | 4.448 | 0.060 | | |
| 11 | 2.027 | 0.155 | 1.62041 | 60.3 |
| 12 | −2.347 | Variable (D12) | | |
| 13 | 2.673 | 0.053 | 1.80518 | 25.4 |
| 14 | 1.153 | 0.222 | | |
| 15 | −0.749 | 0.058 | 1.84666 | 23.8 |
| 16 | 1.290 | 0.393 | 1.77250 | 49.6 |
| 17 | −1.220 | 0.011 | | |
| *18 | 3.485 | 0.233 | 1.53039 | 55.2 |
| *19 | −3.172 | Variable (D19) | | |
| 20 | 5.398 | 0.290 | 1.80518 | 25.4 |

TABLE 9-continued

| 21 | −2.056 | 0.403 | | |
|----|--------|-------|--------|------|
| 22 | ∞ | 1.288 | 1.51633 | 64.1 |
| 23 | ∞ | | | |

*represents aspherical surface

| | Zoom ratio | D4 | D8 | D12 | D19 | f |
|---|---|---|---|---|---|---|
| wide | 1.00 | 0.595 | 0.780 | 0.027 | 0.060 | 0.996 |
| middle | 1.10 | 0.491 | 0.699 | 0.184 | 0.088 | 1.092 |
| telephoto | 1.20 | 0.397 | 0.615 | 0.351 | 0.099 | 1.197 |

| Reduction ratio | −0.0103 |
|---|---|
| Conditional expression (1) Nd | 1.71300 |
| Conditional expression (2) vd | 53.9 |
| Conditional expression (3) F2 | 1.276 |
| Conditional expression (4) F3 | 3.017 |
| Conditional expression (5) F4 | −4.185 |
| F | 1.000 |

Figure 10:
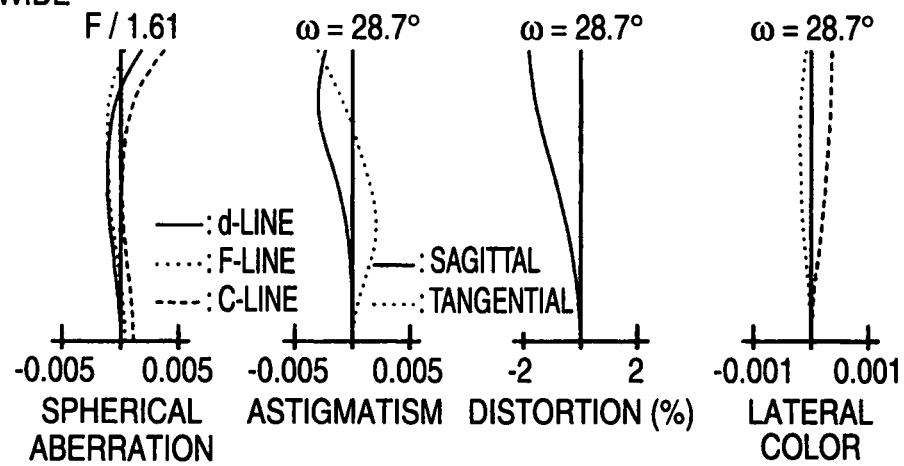
FIG. 10 shows charts of respective aberrations at a wide-angle end, a middle end, and a telephoto end of the zoom lens according to the example 5.
Figure 10:
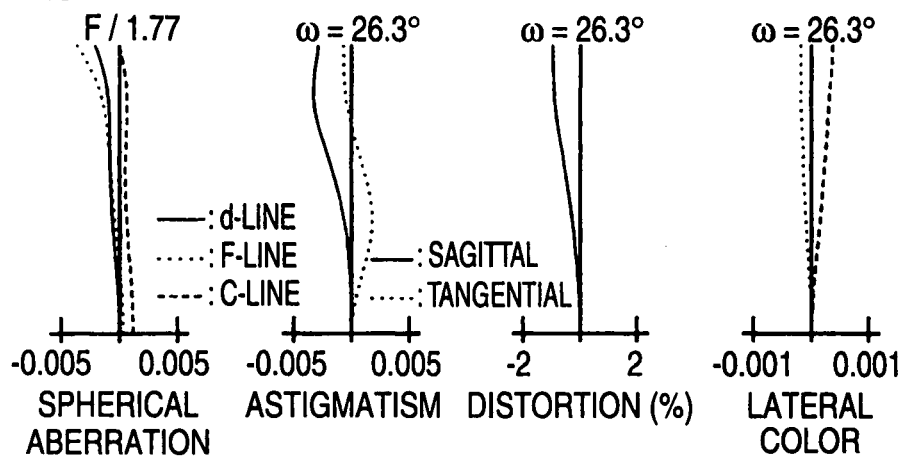
Figure 10:
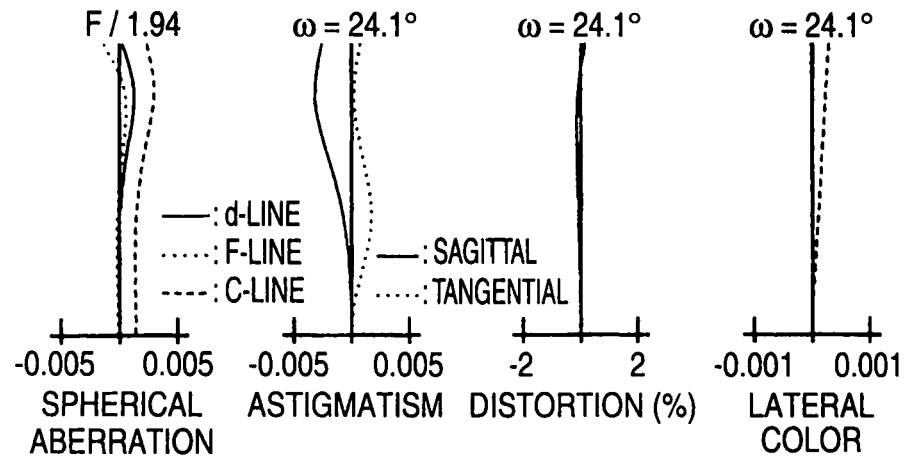

F: focal distance of the entire system when the conjugate distance on the magnification side is FIG. 10 is aberration charts showing various aberrations (spherical aberration, astigmatism, distortion, and lateral color) at the wide-angle end (WIDE), the middle end (MIDDLE), and the telephoto end (TELE) of the zoom lens according to the example 5.

As apparent from FIG. 10, according to the zoom lens of the example 5, a good aberration correction can be made over the full zoom range while keeping the wide angle of view. In addition, FNo at the wide-angle end is 1.61, which gives a brighter zoom lens.

Also, the zoom lens of the example 5 satisfies all the conditional expressions (1) to (5) as shown in the lower portion of the table 9.

In the examples, the lens of the embodiment is used as the projection lens of the projection display device using the transmission liquid crystal display panel. The use mode of the zoom lens of the invention is not limited thereto. The zoom lens of the embodiment may be used as a projection lens of the device using the reflection liquid crystal display panel, a projection lens of the device using other optical modulating means such as DMD, or the like, and the like. In addition, the zoom lens of the embodiment may be used as an image forming lens having a zooming function used in the imaging means such as CCD, camera tube, or the like, the camera using the silver halide film, or the like.

What is claimed is:

1. A zoom lens comprising in order from a magnification side:
   a first lens group having a negative refractive power, the first lens group which is fixed during varying of a power of the zoom lens and which executes focusing;
   a second lens group having a positive refractive power;
   a third lens group having a positive refractive power;
   a fourth lens group having a negative refractive power, wherein the second, third and fourth lens groups move interrelatedly so as to continuously vary the power of the zoom lens and to correct movement of an image plane caused by the continuous varying of the power of the zoom lens; and
   a fifth lens group having a positive refractive power, the fifth lens group which is fixed during the varying of the power of the zoom lens, wherein:
   the first lens group consists of two single lenses including:
      a glass lens having a convex surface of a negative meniscus shape, which is directed toward the magnification side; and
   a plastic lens having a convex surface of a negative meniscus shape, which is directed toward the magnification side,
   at least one surface of the plastic lens is an aspheric surface, and
   the glass lens satisfies:

$$1.56 < Nd < 1.80 \quad (1)$$

$$vd > 45 \quad (2)$$

where Nd denotes refractive index with respect to d-line, and
vd denotes Abbe number with respect to d-line.

2. The lens according to claim 1, wherein each of the second lens group, the third lens group and the fourth lens group comprises only spherical lenses.

3. The lens according claim 2, wherein:
   the second and third lens groups move to the magnification side during the varying of the power of the zoom lens from a wide-angle end to a telephoto end,
   the second and third lens groups satisfy:

$$1.0 < F2/F < 2.0 \quad (3)$$

$$2.0 < F3/F < 7.0 \quad (4)$$

where F denotes a focal length of a total lens system at a wide-angle end,
F2 denotes a focal length of the second lens group, and
F3 denotes a focal length of the third lens group,
the fourth lens group comprises a single positive lens disposed on a most reduction side, and
the fifth lens group comprises one positive lens.

4. The lens according to claim 3, wherein the second lens group comprises two positive lenses.

5. The lens according claim 1, wherein the second and third lens groups move to the magnification side during the varying of the power of the zoom lens from a wide-angle end to a telephoto end.

6. The lens according to claim 1, wherein the second and third lens groups satisfy:

$$1.0 < F2/F < 2.0 \quad (3)$$

$$2.0 < F3/F < 7.0 \quad (4)$$

where F denotes a focal length of a total lens system at a wide-angle end,
F2 denotes a focal length of the second lens group, and
F3 denotes a focal length of the third lens group.

7. The lens according to claim 1, wherein the second lens group comprises two positive lenses.

8. The lens according to claim 1, wherein:
The fifth lens group comprises in order from the magnification side:
a positive lens made of plastic; and
a positive lens made of glass.

9. A projection display device comprising:
a light source;
a light valve; and
a projection lens that projects an optical image, which is formed by light modulated by the light valve, on a screen, wherein the projection lens comprises the zoom lens according to claim 1.

10. A zoom lens comprising in order from a magnification side:
   a first lens group having a negative refractive power, the first lens group which is fixed during varying of a power of the zoom lens and which executes focusing;
   a second lens group having a positive refractive power;
   a third lens group having a positive refractive power;
   a fourth lens group having a negative refractive power, wherein the second, third and fourth lens groups move interrelatedly so as to continuously vary the power of the zoom lens and to correct movement of an image plane caused by the continuous varying of the power of the zoom lens; and a fifth lens group having a positive refractive power, the fifth lens group which is fixed during the varying of the power of the zoom lens, wherein:

the first lens group comprises in order from the magnification side:

a glass lens having a convex surface of a negative meniscus shape, which is directed toward the magnification side; and a plastic lens having a convex surface of a negative meniscus shape, which is directed toward the magnification side, at least one surface of the plastic lens is an aspheric surface, and the glass lens satisfies:

$$1.56 < Nd < 1.80 \quad (1)$$

$$vd > 45 \quad (2)$$

where Nd denotes refractive index with respect to d-line, and vd denotes Abbe number with respect to d-line wherein:

the fourth lens group comprises in order from the magnification side:

a negative lens; and a cemented lens formed by joining another negative lens and a positive lens.

11. The lens according claim 10, wherein the second and third lens groups move to the magnification side during the varying of the power of the zoom lens from a wide-angle end to a telephoto end.

12. The lens according to claim 11, wherein the second and third lens groups satisfy:

$$1.0 < F2/F < 2.0 \quad (3)$$

$$2.0 < F3/F < 7.0 \quad (4)$$

where F denotes a focal length of a total lens system at a wide-angle end,

F2 denotes a focal length of the second lens group, and

F3 denotes a focal length of the third lens group.

13. The lens according to claim 12, wherein the second lens group comprises two positive lenses.

14. The lens according to claim 13, wherein:

the fourth lens group comprises a single positive lens disposed on a most reduction side, the fifth lens group comprises one positive lens, and the positive lens of the fourth lens group disposed on the most reduction side has at least one aspheric surface and is made of a plastic lens.

15. The lens according to claim 10, wherein the second lens group comprises two positive lenses.

16. The lens according to claim 10, wherein:

the fourth lens group comprises a single positive lens disposed on a most reduction side, the fifth lens group comprises one positive lens, and the positive lens of the fourth lens group disposed on the most reduction side has at least one aspheric surface and is made of a plastic lens.

17. The lens according to claim 16, wherein the fourth lens group satisfies:

$$F4/F < -1.0 \quad (5)$$

where F denotes a focal length of a total lens system at a wide-angle end, and

F4 denotes a focal length of the fourth lens group.

18. A zoom lens according to claim comprising in order from a magnification side:

a first lens group having a negative refractive power, the first lens group which is fixed during varying of a power of the zoom lens and which executes focusing;

a second lens group having a positive refractive power;

a third lens group having a positive refractive power;

a fourth lens group having a negative refractive power, wherein the second, third and fourth lens groups move interrelatedly so as to continuously vary the power of the zoom lens and to correct movement of an image plane caused by the continuous varying of the power of the zoom lens; and a fifth lens group having a positive refractive power, the fifth lens group which is fixed during the varying of the power of the zoom lens, wherein:

the first lens group comprises in order from the magnification side;

a glass lens having a convex surface of a negative meniscus shape, which is directed toward the magnification side; and a plastic lens having a convex surface of a negative meniscus shape, which is directed toward the magnification side, at least one surface of The plastic lens is an as aspheric surface, and the glass lens satisfies:

$$1.56 < Nd < 1.80 \quad (1)$$

$$vd > 45 \quad (2)$$

where Nd denotes refractive index with respect to d-line, and vd denotes Abbe number with respect to d-line wherein:

the fourth lens group comprises a single positive lens disposed on a most reduction side, and the fifth lens group comprises one positive lens.

19. The lens according to claim 18, wherein The positive lens of the fourth lens group disposed on the most reduction side has at least one aspheric surface and is made of a plastic lens.

20. The lens according to claim 19, wherein the fourth lens group satisfies:

$$F4/F < -1.0 \quad (5)$$

where F denotes a focal length of a total lens system at a wide-angle end, and

F4 denotes a focal length of the fourth lens group.

21. A zoom lens comprising in order from a magnification side:

a first lens group having a negative refractive power, the first lens group which is fixed during varying of a power of the zoom lens and which executes focusing;

a second lens group having a positive refractive power;

a third lens group having a positive refractive power;

a fourth lens group having a negative refractive power, wherein the second, third and fourth lens groups move interrelatedly so as to continuously vary the power of the zoom lens and to correct movement of an image plane caused by the continuous varying of the power of the zoom lens; and a fifth lens group having a positive refractive power, the fifth lens group which is fixed during the varying of the power of the zoom lens, wherein:

the first lens group comprises in order from the magnification side:

a glass lens having a convex surface of a negative meniscus shape, which is directed toward the magnification side; and a plastic lens having a convex surface of a negative meniscus shape, which is directed toward the magnification side, at least one surface of the plastic lens is an aspheric surface, and the glass lens satisfies:

$$1.56 < Nd < 1.80 \quad (1)$$

$$vd > 45 \quad (2)$$

where Nd denotes refractive index with respect to d-line, and vd denotes Abbe number with respect to d-line wherein each of the second lens group, the third lens group and the fourth lens group comprises only spherical lenses and wherein:

the fourth lens group comprises in order from the magnification side:

a negative lens; and a cemented lens formed by joining another negative lens and a positive lens, the fourth lens group comprises a single positive lens disposed on a most reduction side, and the fifth lens group comprises one positive lens.

22. The lens according claim 21, wherein the second and third lens groups move to the magnification side during the varying of the power of the zoom lens from a wide-angle end to a telephoto end, the second and third lens groups satisfy:

$$1.0 < F2/F < 2.0 \quad (3)$$

$$2.0 < F3/F < 7.0 \quad (4)$$

where F denotes a focal length of a total lens system at a wide-angle end,

F2 denotes a focal length of the second lens group, and

F3 denotes a focal length of the third lens group, and the second lens group comprises two positive lenses.

23. A zoom lens comprising in order from a magnification side:

a first lens group having a negative refractive power, the first lens group which is fixed during varying of a power of the zoom lens and which executes focusing;

a second lens group having a positive refractive power;

a third lens group having a positive refractive power;

a fourth lens group having a negative refractive power, wherein the second, third and fourth lens groups move interrelatedly so as to continuously vary the power of the zoom lens and to correct movement of an image plane caused by the continuous varying of the power of the zoom lens; and a fifth lens group having a positive refractive power, the fifth lens group which is fixed during the varying of the power of the zoom lens, wherein:

the first lens group comprises in order from the magnification side:

a glass lens having a convex surface of a negative meniscus shape, which is directed toward the magnification side; and a plastic lens having a convex surface of a negative meniscus shape, which is directed toward the magnification side, at least one surface of the plastic lens is an aspheric surface, and the glass lens satisfies:

$$1.56 < Nd < 1.80 \quad (1)$$

$$vd > 45 \quad (2)$$

where Nd denotes refractive index with respect to d-line, and vd denotes Abbe number with respect to d-line wherein each of the second lens group, the third lens group and the fourth lens group comprises only spherical lenses, and wherein:

the fourth lens group comprises in order from the magnification side:

a negative lens; and a cemented lens formed by joining another negative lens and a positive lens, and the fifth lens group comprises in order from the magnification side:

a positive lens made of plastic; and a positive lens made of glass.

24. The lens according claim 23, wherein the second and third lens groups move to the magnification side during the varying of the power of the zoom lens from a wide-angle end to a telephoto end, the second and third lens groups satisfy:

$$1.0 < F2/F < 2.0 \quad (3)$$

$$2.0 < F3/F < 7.0 \quad (4)$$

where F denotes a focal length of a total lens system at a wide-angle end,

F2 denotes a focal length of the second lens group, and

F3 denotes a focal length of the third lens group, and the second lens group comprises two positive lenses.

25. A zoom lens comprising in order from a magnification side:

a first lens group having a negative refractive power, the first lens group which is fixed during varying of a power of the zoom lens and which executes focusing;

a second lens group having a positive refractive power;

a third lens group having a positive refractive power;

a fourth lens group having a negative refractive power, wherein the second, third and fourth lens groups move interrelatedly so as to continuously vary the power of the zoom lens and to correct movement of an image plane caused by the continuous varying of the power of the zoom lens; and a fifth lens group having a positive refractive power, the fifth lens group which is fixed during the varying of the power of the zoom lens, wherein:

the first lens group comprises in order from the magnification side:

a glass lens having a convex surface of a negative meniscus shape, which is directed toward the magnification side; and a plastic lens having a convex surface of a negative meniscus shape, which is directed toward the magnification side, at least one surface of the plastic lens is an aspheric surface, and the glass lens satisfies:

$$1.56 < Nd < 1.80 \quad (1)$$

$$vd > 45 \quad (2)$$

where Nd denotes refractive index with respect to d-line, and vd denotes Abbe number with respect to d-line wherein wherein the second and third lens groups move to the magnification side during the varying of the power of the zoom lens from a wide-angle end to a telephoto end and wherein:

the second and third lens groups satisfy:

$$1.0 < F2/F < 2.0 \quad (3)$$

$$2.0 < F3/F < 7.0 \quad (4)$$

where F denotes a focal length of a total lens system at a wide-angle end,

F2 denotes a focal length of the second lens group, and

F3 denotes a focal length of the third lens group, the second lens group comprises two positive lenses, the fourth lens group comprises a single positive lens disposed on a most reduction side, and the fifth lens group comprises one positive lens.

26. The lens according to claim 25, wherein the positive lens of the fourth lens group disposed on the most reduction side has at least one aspheric surface and is made of a plastic lens.

27. The lens according to claim 26, wherein the fourth lens group satisfies:

$$F4/F < -1.0 \quad (5)$$

where F denotes a focal length of a total lens system at a wide-angle end, and

F4 denotes a focal length of the fourth lens group.

28. A zoom lens comprising in order from a magnification side:

a first lens group having a negative refractive power, the first lens group which is fixed during varying of power of the zoom lens and which executes focusing;

a second lens group having a positive refractive power;

a third lens group having a positive refractive power;

a fourth lens group having a negative refractive power, wherein the second, third and fourth lens groups move interrelatedly so as to continuously vary the power of the zoom lens and to correct movement of an image plane caused by continuous varying of the power of the zoom lens; and a fifth lens group having a positive refractive power, the fifth lens group which is fixed during the varying of the power of the zoom lens, wherein:

the first lens group comprises in order from the magnification side:

a glass lens having a convex surface of a negative meniscus shape, which is directed toward the magnification side; and a plastic lens having a convex surface of a negative meniscus shape, which is directed toward the magnification side, at least one surface of the elastic lens is an aspheric surface, and the glass lens satisfies:

$$1.56 < Nd < 1.80 \quad (1)$$

$$vd > 45 \quad (2)$$

where Nd denotes refractive index with respect to d-line, and vd denotes Abbe number with respect to d-line wherein the second and third lens groups move to the magnification side during the varying of the power of the zoom lens from a wide-angle end to a telephoto end, and wherein:

the second and third lens groups satisfy:

$$1.0 < F2/F < 2.0 \quad (3)$$

$$2.0 < F3/F < 7.0 \quad (4)$$

where F denotes a focal length of a total lens system at a wide-angle end,

F2 denotes a focal length of the second lens group, and

F3 denotes a focal length of the third lens group, the fourth lens group comprises a single positive lens disposed on a most reduction side, and the fifth lens group comprises one positive lens.

* * * * *